(12) United States Patent
Dougherty et al.

(10) Patent No.: US 10,340,561 B2
(45) Date of Patent: Jul. 2, 2019

(54) DEVICES AND METHOD FOR SMELTERLESS RECYCLING OF LEAD ACID BATTERIES

(71) Applicant: Aqua Metals Inc., Alameda, CA (US)

(72) Inventors: Brian Dougherty, Emeryville, CA (US); Michael John King, Oakland, CA (US); Robert Lewis Clarke, Orinda, CA (US); Stephen R. Clarke, Orinda, CA (US); Michael David Hurwitz, Alameda, CA (US)

(73) Assignee: Aqua Metals Inc., Alameda, CA (US)

( * ) Notice: Subject to any disclaimer, the term of this patent is extended or adjusted under 35 U.S.C. 154(b) by 60 days.

(21) Appl. No.: 15/527,749

(22) PCT Filed: May 13, 2015

(86) PCT No.: PCT/US2015/030626
§ 371 (c)(1),
(2) Date: May 18, 2017

(87) PCT Pub. No.: WO2016/081030
PCT Pub. Date: May 26, 2016

(65) Prior Publication Data
US 2017/0352927 A1    Dec. 7, 2017

Related U.S. Application Data

(63) Continuation-in-part of application No. PCT/US2014/066142, filed on Nov. 18, 2014.
(Continued)

(51) Int. Cl.
*C25C 1/18* (2006.01)
*C25C 5/02* (2006.01)
(Continued)

(52) U.S. Cl.
CPC ............ *H01M 10/54* (2013.01); *C25C 1/18* (2013.01); *C25C 5/02* (2013.01); *C25C 7/00* (2013.01);
(Continued)

(58) Field of Classification Search
CPC ........ H01M 10/06; H01M 10/54; H01M 4/14; C25C 1/18; C25C 7/00; C25C 7/005; C25C 7/007; C25C 7/04; C25C 7/02
See application file for complete search history.

(56) References Cited

U.S. PATENT DOCUMENTS

| 292,753 A | 1/1884 | Kessler et al. |
|---|---|---|
| 1,148,062 A | 7/1915 | Tucker et al. |

(Continued)

FOREIGN PATENT DOCUMENTS

| CA | 1308057 | 9/1992 |
|---|---|---|
| CA | 1310837 | 12/1992 |

(Continued)

OTHER PUBLICATIONS

Buzatu et al., "Studies on mathematical modeling of the leaching process in order to efficiently recover lead from the sulfate/oxide lead paste," Waste Management, Feb. 2017; 60:723-733.
(Continued)

*Primary Examiner* — Karie O'Neill Apicella
(74) *Attorney, Agent, or Firm* — Umberg Zipser LLP (57) ABSTRACT

Lead from lead acid battery scrap is recovered in two separate production streams as clean grid lead and as high-purity lead without smelting. In preferred aspects, lead recovery is performed in a continuous process that uses an aqueous electroprocessing solvent and electro-refining. Spent electroprocessing solvent and/or base utilized to treat lead paste from the lead acid battery scrap can be recycled to the recovery process.

16 Claims, 5 Drawing Sheets

Related U.S. Application Data (60) Provisional application No. 61/905,941, filed on Nov. 19, 2013.

(51) Int. Cl.
| | |
|---|---|
| C25C 7/00 | (2006.01) |
| C25C 7/08 | (2006.01) |
| H01M 4/14 | (2006.01) |
| H01M 10/06 | (2006.01) |
| H01M 10/54 | (2006.01) |

(52) U.S. Cl.
CPC .............. *C25C 7/005* (2013.01); *C25C 7/007* (2013.01); *C25C 7/08* (2013.01); *H01M 4/14* (2013.01); *H01M 10/06* (2013.01); *Y02P 10/212* (2015.11); *Y02W 30/84* (2015.05)

(56) References Cited

U.S. PATENT DOCUMENTS

| | | | |
|---|---|---|---|
| 1,334,419 | A | 3/1920 | Tainton |
| 1,752,356 | A | 4/1930 | Smith et al. |
| 1,759,494 | A | 5/1930 | Tainton |
| 1,911,604 | A | 5/1933 | Calbeck |
| 1,942,208 | A | 1/1934 | Gamichon |
| 2,655,472 | A | 10/1953 | Hilliard et al. |
| 3,395,010 | A | 7/1968 | Shoeld |
| 3,616,277 | A | 10/1971 | Adamson |
| 3,772,003 | A | 11/1973 | Gordy |
| 3,860,509 | A | 1/1975 | Emmett, Jr. |
| 4,035,242 | A | 7/1977 | Brandt |
| 4,097,354 | A | 6/1978 | Ginatta |
| 4,107,007 | A | 8/1978 | Gaumann |
| 4,118,219 | A | 10/1978 | Elmore et al. |
| 4,128,460 | A | 12/1978 | Nishimura et al. |
| 4,159,231 | A | 6/1979 | Smith et al. |
| 4,222,769 | A | 9/1980 | Okuda et al. |
| 4,229,271 | A | 10/1980 | Prengaman et al. |
| 4,269,810 | A | 5/1981 | Kolakowski |
| 4,460,442 | A | 7/1984 | Ducati |
| 4,650,553 | A | 3/1987 | Felgendreger et al. |
| 4,652,349 | A | 3/1987 | Behringer et al. |
| 4,769,116 | A | 9/1988 | Olper et al. |
| 4,849,059 | A | 7/1989 | Deresh et al. |
| 4,927,510 | A | 5/1990 | Olper et al. |
| 5,106,466 | A | 4/1992 | Olper et al. |
| 5,124,008 | A | 6/1992 | Rendall et al. |
| 5,230,779 | A | 7/1993 | Martin |
| 5,211,818 | A | 11/1993 | Masante et al. |
| 5,262,020 | A | 11/1993 | Masante et al. |
| 5,429,661 | A | 7/1995 | Khodov et al. |
| 5,514,263 | A | 5/1996 | Spijkerman et al. |
| 5,520,794 | A | 5/1996 | Gernon |
| 5,750,019 | A | 5/1998 | Olper |
| 5,827,347 | A | 10/1998 | Margulis |
| 5,928,488 | A | 7/1999 | Newman |
| 6,183,619 | B1 | 2/2001 | Gillman et al. |
| 6,428,676 | B1 | 8/2002 | Onuoha |
| 6,679,471 | B2 | 1/2004 | Domeier et al. |
| 7,368,043 | B2 | 5/2008 | Mohanta et al. |
| 7,507,496 | B1 | 3/2009 | Kinsbursky |
| 8,323,595 | B1 | 12/2012 | Smith et al. |
| 8,409,421 | B2 | 4/2013 | Olper et al. |
| 8,580,414 | B2 | 11/2013 | Clarke |
| 2004/0004003 | A1 | 1/2004 | Hesse |
| 2004/0140222 | A1 | 7/2004 | Smedley et al. |
| 2004/0222085 | A1 | 11/2004 | Mohanta et al. |
| 2006/0091017 | A1 | 5/2006 | Lam |
| 2008/0128293 | A1 | 5/2008 | Mohanta et al. |
| 2010/0043600 | A1 | 2/2010 | Martini |
| 2011/0083970 | A1 | 4/2011 | Olper et al. |
| 2011/0265969 | A1 | 11/2011 | Liu et al. |
| 2014/0131219 | A1 | 5/2014 | Fassbender et al. |
| 2014/0131220 | A1 | 5/2014 | Fassbender et al. |
| 2015/0368750 | A1 | 12/2015 | Spence |
| 2016/0294024 | A1 | 10/2016 | Clarke et al. |
| 2016/0308261 | A1 | 10/2016 | Tyagi et al. |
| 2017/0127888 | A1 | 5/2017 | Culton, Sr. |
| 2017/0159191 | A1 | 6/2017 | Clarke et al. |
| 2017/0352927 | A1 | 12/2017 | Dougherty et al. |
| 2018/0069276 | A1 | 3/2018 | Clarke et al. |
| 2018/0127852 | A1 | 5/2018 | Clarke et al. |
| 2018/0355494 | A1 | 12/2018 | Clarke et al. |

FOREIGN PATENT DOCUMENTS

| | | |
|---|---|---|
| CN | 101250720 A | 8/2008 |
| CN | 101335370 A | 12/2008 |
| CN | 101918600 A | 12/2010 |
| CN | 102146572 A | 8/2011 |
| CN | 102560535 B | 7/2012 |
| CN | 1026188884 | 8/2012 |
| CN | 103509949 A | 1/2014 |
| CN | 104039991 A | 9/2014 |
| CN | 104532302 A | 4/2015 |
| CN | 105981212 A | 9/2016 |
| CN | 107112606 A | 8/2017 |
| EP | 0038366 | 10/1981 |
| EP | 0724306 | 7/1996 |
| FR | 2207997 A1 | 6/1974 |
| IN | 59250 | 12/1957 |
| JP | 5493626 | 7/1979 |
| JP | 5848645 | 3/1983 |
| JP | H9-13189 | 1/1997 |
| JP | 2001-017942 A | 1/2001 |
| SU | 1151595 A | 4/1985 |
| WO | 9214866 A1 | 9/1992 |
| WO | 9533756 A1 | 12/1995 |
| WO | 9966105 A1 | 12/1999 |
| WO | 2007044852 A2 | 4/2007 |
| WO | 2008044852 A1 | 4/2008 |
| WO | 2013152260 A1 | 10/2013 |
| WO | 2014076544 A1 | 5/2014 |
| WO | 2014076547 A1 | 5/2014 |
| WO | 2015057189 A1 | 4/2015 |
| WO | 2015077227 A1 | 5/2015 |
| WO | 2015084950 A1 | 6/2015 |
| WO | 2016081030 A1 | 5/2016 |
| WO | 2016130675 A1 | 8/2016 |
| WO | 2016183428 A1 | 11/2016 |
| WO | 2016183429 A1 | 11/2016 |
| WO | 2016183431 A1 | 11/2016 |
| WO | 2017096209 A1 | 6/2017 |

OTHER PUBLICATIONS

Carlos, et al., "Study of the influence of glycerol on the cathodic process of lead electrodeposition and on its morphology," J. Power Sources, Jan. 2001; 92:56-64.

Carlos et al., "Voltammetric study of lead electrodeposition in the presence of sorbitol and morphological characterization," May 2003; 117:179-186.

Carlos, et al., "Voltammetric and morphological study of lead electrodeposition on copper substrate for application of a lead-acid batteries," J. Power Sources, May 2004; 132(1-2)261-265.

International Preliminary Report on Patentability for Application No. PCT/US2014/066142, dated Mar. 8, 2016; 43 pgs.

International Search Report and Written Opinion for Application No. PCT/US2014/066142, dated Mar. 24, 2015; 16 pgs.

International Preliminary Report on Patentability for Application No. PCT/US2016/032334, dated Aug. 28, 2017; 14 pgs.

International Search Report and Written Opinion for Application No. PCT/US2016/032334, dated Sep. 12, 2016; 17 pgs.

Second Written Opinion for Application No. PCT/US2016/032334, dated May 22, 2017; 4 pgs.

International Preliminary Report on Patentability for Application No. PCT/US2016/032332, dated Sep. 4, 2017; 25 pgs.

International Search Report and Written Opinion for Application No. PCT/US2016/032332, dated Sep. 12, 2016; 18 pgs.

International Preliminary Report on Patentability for Application No. PCT/US2015/032338, dated May 18, 2017; 7 pgs.

(56) References Cited

OTHER PUBLICATIONS

International Search Report and Written Opinion for Application No. PCT/US2015/032338 dated Oct. 21, 2016; 17 pgs.
International Preliminary Report on Patentability for Application No. PCT/US2016/064697, dated Feb. 19, 2018; 18 pgs.
International Search Report and Written Opinion for Application No. PCT/US2016/064697, dated Mar. 10, 2017; 14 pgs.
Atanasova et al., "Desulpherization of lead cake by sodium carbonate and sodium hydroxide," Journal of the University of Chemical Technology and Metallurgy, 2008; 43(2):267-272.
Bandanoiu et al., "Study Concerning PbO Solubility in NaOH Solution forth eTreatment of Sulfate-oxide Pastes Ibtained fro Dismantling used Lead-acid Batteries," Rev. Chem., Jan. 2013; 64(9):1004-1010.
Birk, "Lead, Pb2+", http://www.public.asu.edu/~jpbirk/qual/qualanal/lead.html, Feb. 2002, accessed on May 9, 2018, evidence of existence as prior art supported by https://web.archive.org/web/20020209174305/http://www.public.asu.edu/~jpbirk/qual/qualanal/lead.html.
Genders, David, "Electrochemical Salt Splitting," Electrosynthesis, Watts New Quarterly Newsletter, Sep. 1995:1(1); 8 pgs.
International Preliminary Report on Patentability for PCT/US2015/030626 dated Mar. 8, 2017; 12 pgs.
International Search Report and Written Opinion for PCT/US2015/030626 dated Sep. 10, 2015; 18 pgs.
Jordan, Manfred, "Chapter 8—Electrodeposition of Lead and Lead Alloys," Modern Electroplating, Fifth Edition; 2010 John Wily & Sons, Inc.; pp. 249-263.
Li et al. "Electrodeposited lead dioxide coatings," Chemical Society Reviews, 2011, vol. 40; pp. 3879-3894.
Madkour, L. "Electrolytic separation of lead and its dioxide from carbonate ore residiuum," Indian J. Chem Tech; Nov. 1995 2(6):343-344.
Malak et al., "Comparative analysis of two processes for desulphurization of battery paste," JAMME, Dec. 2012; 55(2):855-859.
Nguyen et al., "More Environmental Friendly Method of Lead Recycling from Waste Battery Paste—an Electrochemical Investigation," 2003, Annual Report of FY 2002. The core University program between Japan Society for the Promotion of Science (JSPS) and National Centre for Natural Science and Technology (NCST); pp. 38-45.
Pletcher, et al., "A novel flow battery—A lead-acid battery based on an electrolyte with soluble lead (II): V. Studies of the lead negative electrode," Journal of Power Sources, 2008; 180:621-629.
Sun et al., "Structural and Morphological Evolution of Lead Dendrites During Electrochemical Migration," Scientific Reports, Nov. 15, 2013; 3(3227); 6 pgs.
Tyagi, "A zero lead pollution and economical recycling process for lead-acid batteries utilizing electrowinning in basic medium," 4th International Lead Conference, http://4islc.conferenceworks.eom.au/presentations/a-zero-lead-pollution-and-economical-recycling-process-for-lead-acid-batteries-utilizing-electrowinning-in-basic-medium/, Downloaded Oct. 13, 2015, 2 pages.
Vaysgant et al., "A low-temperature technique for recycling lead/acid battery scrap without wastes and with improved environmental control," Journal of Power Sources, Feb. 1995; 53(2):303-306.
Wong et al, "Lead electrodeposition from very alkaline media," Electrochemica Acta, Nov. 2005; 51(4):619-626.
Walsh et al., "Versatile electrochemical coatings and surface layers from aqueous methanesulfonic acid," Surface & Coatings Tech, 2014; 259:676-697.

Figure 4C

DEVICES AND METHOD FOR SMELTERLESS RECYCLING OF LEAD ACID BATTERIES This application claims priority to PCT Application No. PCT/US14/66142, filed Nov. 18, 2014.

FIELD OF THE INVENTION

The field of the invention is recycling of lead acid batteries, especially as it relates to devices and methods that utilize aqueous solutions and do not require smelting and that can be performed in continuous fashion.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Lead acid batteries (LABs) are the single largest class of batteries used today. They are essential for applications ranging from starting automobile engines, providing emergency back-up power for data centers, and powering industrial and recreational vehicles such as fork lift trucks and golf carts. Unlike any other battery type, LABs are almost 100% recycled and this feature puts lead as the single most recycled commodity. While LAB production is increasing at an average rate of about 5% per year globally, production of new lead from ore is becoming increasingly difficult as lead rich ore deposits as depleted. Not surprisingly, new and more efficient methods for lead recycling are urgently needed.

Figure 1A:
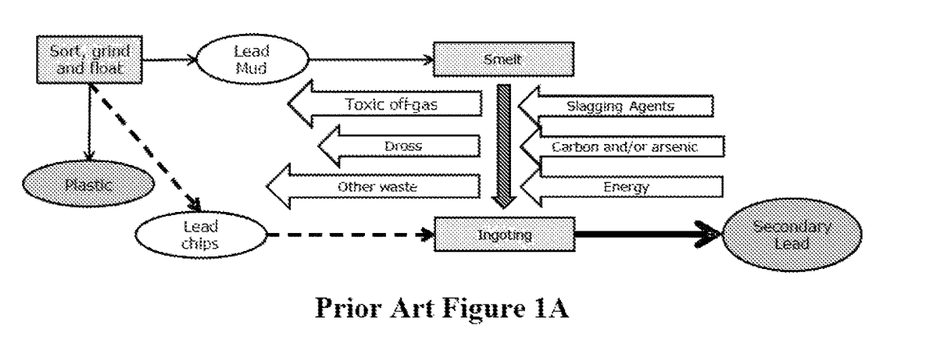
FIG. 1A is a schematic of a conventional smelting process for ground lead acid battery materials.

Unfortunately, all or almost all of the current lead recycling from LABs is still based on lead smelting technology, originally developed over 2000 years ago to produce lead from ore bodies. Lead smelting is a pyro-metallurgical process in which lead, lead oxides, and other lead compounds are heated to about 1600° F. and then mixed with various reducing agents to remove oxides, sulfates, and other non-lead materials. Prior Art FIG. 1 depicts a typical smelting operation starting with ground up LAB materials.

Unfortunately, lead smelting is a highly polluting process, generating significant airborne waste (e.g., lead dust, $CO_2$, arsenic, $SO_2$), solid waste (lead containing slag), and liquid waste (e.g., sulfuric acid, arsenic salts), and pollution issues have forced the closure of many smelters in the US and other Western countries. Migration and expansion of smelters in less regulated countries has resulted in large scale pollution and high levels of human lead contamination.

To complicate matters, obtaining permits for lead smelters has become increasingly difficult, and smelting plants are generally expensive to build and operate. Consequently, profitable operation of smelters is a function of scale. As such, there is a drive towards larger and more centralized smelters, which is at odds with the logistics of the LAB industry that favors distributed recycling and production located close to concentrations of LAB use. As a result, only the largest LAB producing companies have been able to justify and operate smelters while other companies rely on secondary lead producers to recycle their batteries and supply them with lead. This can make it difficult for LAB producers to meet increasingly stringent requirements for "cradle to grave" control of their products, such as the international standard ISO 14000.

On a more technical level, it should be appreciated that lead smelting was developed to produce lead from lead ore (primarily Galena or lead sulfide). However, the chemistry of recycled lead acid batteries is vastly different to the chemistry of lead smelting of ores. As such lead smelting is a fundamentally inefficient process for lead recycling.

Various efforts have been made to move away from smelting operations and to use more environmentally friendly solutions. For example, U.S. Pat. No. 4,927,510 (to Olper and Fracchia) teaches recovering in pure metal form substantially all lead from battery sludge after a desulfurization process. All applications and publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. Unfortunately, the '510 patent still requires use of a fluorine containing electrolyte, which is equally problematic.

To overcome some of the difficulties associated with fluorine containing electrolyte, desulfurized lead active materials have been dissolved in methane sulfonic acid as described in U.S. Pat. No. 5,262,020 (to Masante and Serracane) and U.S. Pat. No. 5,520,794 (to Gernon). However, as lead sulfate is rather poorly soluble in methane sulfonic acid, upstream pre-desulfuiization is still necessary and residual insoluble materials typically reduced the overall yield to an economically unattractive process. To improve at least some of the aspects associated with lead sulfate, oxygen and/or ferric methane sulfonate can be added as described in International Patent Application Publication No. WO 2014/076544 (to Fassbender et al), or mixed oxides can be produced as taught in International Patent Application Publication No. WO 2014/076547 (to Fassbender et al). However, despite the improved yield, several disadvantages nevertheless remain. Among other things, solvent reuse in these processes often requires additional effort, and residual sulfates are still lost as waste product. Moreover, during process upset conditions or power outage (which is not uncommon in electrolytic lead recovery), the plated metallic lead will dissolve back into the electrolyte in conventional electrolytic recovery operations, unless the cathode was removed and the lead peeled off, rendering batch operation at best problematic.

Thus, even though numerous methods for lead recycling are known in the art, all or almost all of them, suffer from one or more disadvantages. Therefore, there is still a need for improved devices and method for smelterless recycling of lead acid batteries, especially in a continuous manner.

SUMMARY OF THE INVENTION

The inventive subject matter is directed to various devices, systems, and methods of lead battery material processing in which an electroprocessing solvent is used to selectively dissolve the active material lead (e.g., PbO, $PbO_2$, and in certain embodiments $PbSO_4$) for recovery of metallic lead while recycling and re-using solvents and other necessary reagents within the process. The dissolved lead is recovered by electrodeposition, preferably in a continuous fashion, while clean solid grid lead is recovered from the lead ion-enriched electroprocessing solvent.

In one embodiment of the inventive concept, lead materials are recovered from lead acid batteries by contacting active material lead with an electroprocessing solvent to generate an electroprocessing solvent with solvate lead ions and solid lead (for example, a lead grid from such a battery). Solid lead is removed from the solvent, and solvated lead ions are reduced on a cathode to provide high purity metallic lead. This reduction of lead ions also regenerates the electroprocessing solvent. In some embodiments sulfur is extracted from the active material lead by treatment with a base, which generates a soluble sulfate. The base is recovered from this soluble sulfate, and is recycled in the process for extraction of sulfate. Suitable electroprocessing solvent include an alkane sulfonic acid, typically between 5% and 50% by weight, and in some embodiments include a chelator in amounts of 0.5% to 20% by weight. In some embodiments high purity lead is removed as lead ions are being reduced, for example by moving the cathode relative to the lead ion enriched electroprocessing solvent. Such high purity lead is in the form of a micro- or nano-porous mixed matrix that has a density of less than 5 g/cm$^3$. Reduction of lead ions provides a regenerated electroprocessing solvent that is recycled into the process by contacting it with lead materials. In some embodiments sulfate and/or metal ions other than lead are removed from such regenerated electroprocessing solvent. In still other embodiments the steps of providing lead materials, contacting the lead materials, removing at least some of the grid lead, and reducing lead ions are performed to allow processing in a continuous fashion.

Another embodiment of the inventive concept is a method for continuously producing high quality lead (e.g. 98% or greater purity) from lead ions solvated in an electroprocessing solvent. A cathode is used to reduce lead ions in such a solvent to form an adherent high purity lead while regenerating the electroprocessing solvent. The high purity lead is removed from one part of the cathode while lead ions are reduced on another part of the cathode, for example by moving the cathode relative to the electroprocessing solvent. The regenerated solvent, in turn, is used treat lead materials to produce a lead ion enriched electroprocessing solvent suitable for producing high quality lead. In some embodiments sulfur is extracted from active material lead using a base, to generate a soluble sulfate salt. The base used for sulfur removal is recovered from the soluble sulfate salt, and this recycled base re-used to extract sulfur from active material lead. Suitable electroprocessing solvents include an alkane sulfonic acid in an amount between 5% and 50% by weight. In some embodiments electroprocessing solvents include a chelator in an amount between 0.5% and 20% by weight. The high purity lead is produced as a micro- or nanoporous mixed matrix with a density of less than 5 g/cm3, and is collected from the cathode in a non-peeling fashion by a harvester positioned proximal to the cathode. In some embodiments sulfate and/or metal ions other than lead are removed from the regenerated electroprocessing solvent.

Another embodiment of the inventive concept is a production intermediate that includes an aqueous solution of an alkane sulfonic acid (at between 5% and 50% by weight), dissolved, base-treated active material lead, and undissolved, solid grid lead. Such base-treated active material lead is essentially or completely desulfurized. In some embodiments the alkane sulfonic acid is methane sulfonic acid and is present at between 15% and 30% by weight.

Another embodiment of the inventive concept is a lead composition that includes metallic lead with a purity of 98% or greater, molecular hydrogen, and an electroprocessing solvent that is free of chelators. The lead composition is in the form of a micro- or nano-porous mixed matrix with a density of less than 5 g/cm$^3$, and in some instances less than 3 g/cm$^3$. In some embodiments the electroprocessing solvent includes an alkane sulfonic acid (for example, methane sulfonic acid) at a concentration of between 5% and 50% by weight.

Another embodiment of the inventive concept is an electrolyzer for producing high quality lead using an electroprocessing solvent. Such an electrolyzer includes an anode and a cathode in an electrodeposition cell that places the anode and cathode (in some instances without an intervening separator) in contact with a lead ion enriched electroprocessing solvent. For example, the cathode can be a rotating disc that moves at a speed that allows the formation of adherent high purity lead as a micro- or nano-porous mixed matrix on the cathode. In some embodiments the cathode can move relative to the electroprocessing solvent. It also includes a lead harvester that is positioned proximal to a surface of the cathode and that is shaped and arranged to collect high purity lead that is adherent to the cathode's surface in a non-peeling manner. In some embodiments the anode is made from titanium and is coated with ruthenium oxide and the cathode is aluminum. In some embodiments the electrolyzer also includes a solvent conditioning unit that is configured to remove sulfate and/or metal ions other than lead from the electrodeposition solvent. In other embodiments the electrolyzer includes an electrochemical cell containing a soluble sulfate salt, and that is configured to produce a sulfuric acid and a base.

Another embodiment of the inventive concept is a method of recycling a lead acid battery. In such a method a lead paste that includes lead sulfate is obtained from the battery and contacted with a base to for a supernatant and a lead hydroxide containing precipitate. The supernatant is treated in an electrochemical cell to generate sulfuric acid and a regenerated base. The precipitate is treated with a solvent to generate a lead ion solution, which is in turn contacted with a collection cathode. An electrical potential is applied to the collection cathode to reduce the lead ions, depositing metallic lead on the collection cathode while regenerating the solvent. Lead is collected from the collection cathode while the regenerated base is recycled in the process to treat additional lead paste. Similarly, the regenerated solvent is used to treat the lead hydroxide containing precipitate formed from the additional lead paste. In some embodiments the solvent solution includes an alkane sulfonic acid and does not include a chelator.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Prior

DETAILED DESCRIPTION

The inventors have now discovered that lead acid battery materials can be recycled in a conceptually simple, yet effective manner where all lead materials are treated with an electroprocessing solvent that helps clean grid lead materials, and especially grids and contacts/bus bars. In some embodiments the electroprocessing solvent dissolves all active lead materials, including lead oxide and lead sulfate. In other embodiments sulfate is extracted from active lead materials by base treatment prior to solvation of lead species in the electroprocessing solvent, providing a base treated active material that is desulfurized or essentially desulfurized (i.e. less than 1% sulfate content). Such an electroprocessing solvents can, upon loading with lead ions due to active materials dissolution, be subjected to an electrodeposition process that allows continuous production of high-purity metallic lead while regenerating the electroprocessing solvent for a further cycle. In addition, sulfate recovered by base treatment can be treated in an electrochemical cell to regenerate the base for a further cycle, thereby providing a closed loop system.

With respect to continuous lead recovery it should be especially appreciated that heretofore known processes would plate metallic lead from an electrolyte onto a cathode in an acidic solution. During process upset conditions or power outages (which are not uncommon in electrolytic lead recovery), the plated metallic lead would dissolve back into the electrolyte unless the cathode was removed and the lead removed. Still further, conventional electrolytic lead recovery processes deposit or plate lead as a strongly bound film to the cathode, which makes removal of the lead labor intensive. For example, lead can be peeled from the cathode as thin, plated sheets that adhere to the cathode's surface. However, such sheets have the tendency to break or flake, and lead removal is thus inefficient and/or cumbersome. In contrast, the lead recovery using the devices and methods according to the inventive subject matter will allow recovery of high purity lead in a non-peeling manner. For example, the lead product can be removed from the cathode as a non-film material (e.g., as amorphous micro- or nanoporous mixed matrix) using a simple wiper or scraper (preferably where the scraper does not directly contact the cathode but is in close proximity, e.g., between 0.5 and 5 mm) as a removal tool, which in turn allows continuous removal on one portion of the cathode while reduction is performed at another portion of the cathode.

In some aspects of the inventive subject matter, the electroprocessing solvent comprises an alkane sulfonic acid in combination with a chelator, and most preferably methane sulfonic acid and EDTA. The inventors surprisingly discovered that all relevant lead species found in active material lead are effectively and quickly dissolved in MSA (methane sulfonic acid) where the MSA includes substantial quantities of a chelator at an acidic pH (i.e., at a pH equal or less than 7.0, equal or less than 6.0, equal or less than 5.0, equal or less than 4.0, or equal or less than 3.0). For example an aqueous solution of MSA and EDTA did dissolve positive active material (e.g., lead sulfate, and especially tri/tetrabasic lead sulfate; $PbSO_4.3PbO.H_2O/PbSO_4.4PbO.H_2O$) as well as negative active material (e.g., lead oxide ranging from Pb(II) to Pb(IV) and multiple partial oxidation states between them). Moreover, it was observed that under dissolving conditions for the active material lead, grid lead (e.g., metallic lead from contacts, bus bars, lead alloys for battery grids, etc.) is not dissolved but instead cleaned by such an electroprocessing solvent. Such finding was particularly unexpected as known processes involving lead dissolution in MSA characterized lead sulfate as being only sparsely soluble in MSA. Therefore, among other benefits of using a chelator (and especially EDTA) in MSA, it should be noted that EDTA synergistically and dramatically enhanced solubility of lead sulfates in MSA. Consequently, it should be recognized that using the electroprocessing solvent of the inventive subject matter, active material lead can be processed without the need for prior desulfurization.

Alternatively, in other embodiments of the inventive concept the electroprocessing solvent includes an alkane sulfonic acid (preferably methanesulfonic acid or MSA) but does not include a chelator. In processes utilizing such a chelator-free solvent, active lead materials are treated with a base (for example, LiOH, NaOH, and/or KOH) to generate soluble sulfate salts and insoluble lead hydroxide from the lead sulfate component of the active lead material. Such a base-treated active lead material includes lead oxides and lead hydroxide that can be collected as a lead containing precipitate. The lead oxides and lead hydroxide of the lead containing precipitate are soluble in alkane sulfonic acids (such as MSA); as a result, in such a method the use of a chelating agent with the alkane sulfonic acid is not necessary.

The soluble sulfate salt generated by base treatment is readily collected as a supernatant and can be processed (for example in an electrochemical cell) to regenerate the base species used for treatment of the active lead material. This advantageously closes the loop for base usage in such a process. Treatment of the supernatant in an electrochemical cell also generates sulfuric acid, which has numerous industrial uses (including production of new lead acid batteries).

Additionally, the inventors also unexpectedly noted that electroprocessing solvents comprising an alkane sulfonic acid with or without a chelator (such as MSA or MSA+ EDTA) are suitable for electrolytic recovery of lead on a cathode. Notably, such recovery could even be performed in an electrodeposition cell without a separator and as such significantly simplified the design of suitable electrolyzers. Such finding was particularly unexpected as prior reports on lead acid batteries having MSA as electrolyte (SLABs) noted that layers of an insoluble form of $PbO_2$ would form on the anode, which effectively shuts down the SLAB battery.

While EDTA has been used to preferentially dissolve lead salts and to support lead electrochemical plating from solution as described in U.S. Pat. No. 7,368,043 (to Mohanta et al), such plating requires a complex and expensive electrochemical cell with a membrane separator to inhibit destruction of the EDTA. Still further, such process also operates at high pH (caustic pH) and it would be impractical to convert all of the active material from a LAB to caustic on a commercial basis. In contrast, EDTA in combination with the MSA at acidic pH not only increased solubility of most lead species, and especially lead sulfates, but also allowed for reduction of ionic lead to an adherent, but not plated form. Similarly, reduction of ionic lead from MSA in the absence of chelators (i.e. following base treatment of active lead materials and MSA solvation of precipitated lead species) also permitted recovery of metallic lead as an adherent, but not plated, form.

As used herein, the terms "adherent" or "weakly associated" in conjunction with metallic lead that was formed by reduction of ionic lead refers to a form of lead that is not a coherent film over the surface of the cathode, but that is amorphous and can be wiped off the cathode. In other words, a weakly associated or adherent lead product does not form in a macroscopic dimension intermetallic bonds between the cathode and the lead product and will therefore not form a coherent lead film on the cathode. For example, by observation in most experiments (e.g., see experimental description below), lead formed in a spongy low density layer that was loosely attached to the cathode, floated off a static plate cathode, and could be washed off the surface of a rotating cathode if electrolyte circulation was too aggressive. Moreover, alkane sulfonic acid without chelator (e.g., MSA) and the combination of the alkane sulfonic acid and chelator (e.g., MSA+EDTA) allowed for stable electrolytic recovery of lead without significant destruction of the alkane sulfonic acid (e.g., MSA) or the chelator (e.g., EDTA). This regeneration of both alkane sulfonic acid or alkane sulfonic acid+chelator electroprocessing solvents permits their re-use in a successive cycle of their respective processes, advantageously closing the loop for electroprocessing solvent utilization in methods of the inventive concept.

Figure 1B:
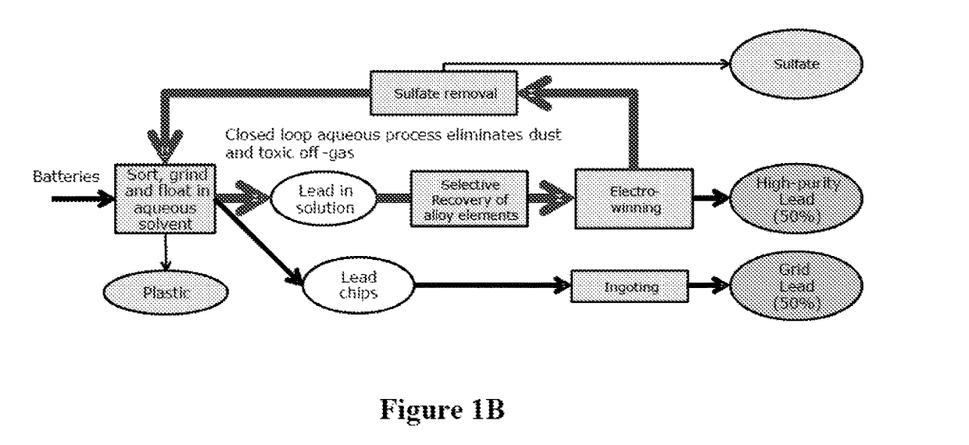
FIG. 1B is an exemplary schematic of a smelter-less process for ground lead acid battery materials according to the inventive subject matter.

Therefore, it should be appreciated that lead acid batteries and battery materials can be processed as exemplarily depicted in FIG. 1B by first crushing or grinding the battery or battery materials to a relatively small size (e.g., average particle size between 0.1 and 1 cm, or between 1 and 3 cm, or between 3 and 5 cm, or larger, in the largest dimension), followed by removal of plastic parts and battery acid (which can be further recycled or processed). The so obtained lead scrap material will predominantly contain grid lead and active material lead, which is then treated in a container with the electroprocessing solvent to clean the grid lead and to dissolve the active material lead. After a suitable period of lead dissolution (or upon complete dissolution of the active material lead), remaining cleaned solid grid lead can be extracted from the solution, optionally washed, and pressed into lead chips/ingots to so yield grid lead that can be directly reused or further refined. The recitation of ranges of values herein is merely intended to serve as a shorthand method of referring individually to each separate value falling within the range. Unless otherwise indicated herein, each individual value is incorporated into the specification as if it were individually recited herein.

The so obtained lead ion-enriched solution may then be treated to remove other non-lead ions (e.g., zinc, calcium, tin, silver, etc.), which may be performed using a selective ion exchange resin, other selective adsorbent, selective electrodeposition, liquid chromatography and/or precipitation. Of course, it should be recognized that such step may also be performed after electrolytic recovery of lead. Regardless of any optional pre-processing, the lead ion-enriched solution is then fed to an electrolyzer to recover the lead in metallic form. While any type of electrolyzer is generally contemplated, especially preferred electrolyzers will include those without separator or membrane between the cathode and the anode, and with a cathode that moves relative to the electrolyte. After reduction of the lead ions, the process will yield a high-purity lead (i.e., at least 98% purity, or at least 99% purity, or at least 99.5% purity). Where the electrolyzer has one or more moving electrodes, and especially rotating disk electrodes, lead is being deposited as adherent but non-film forming lead.

Figure 2:
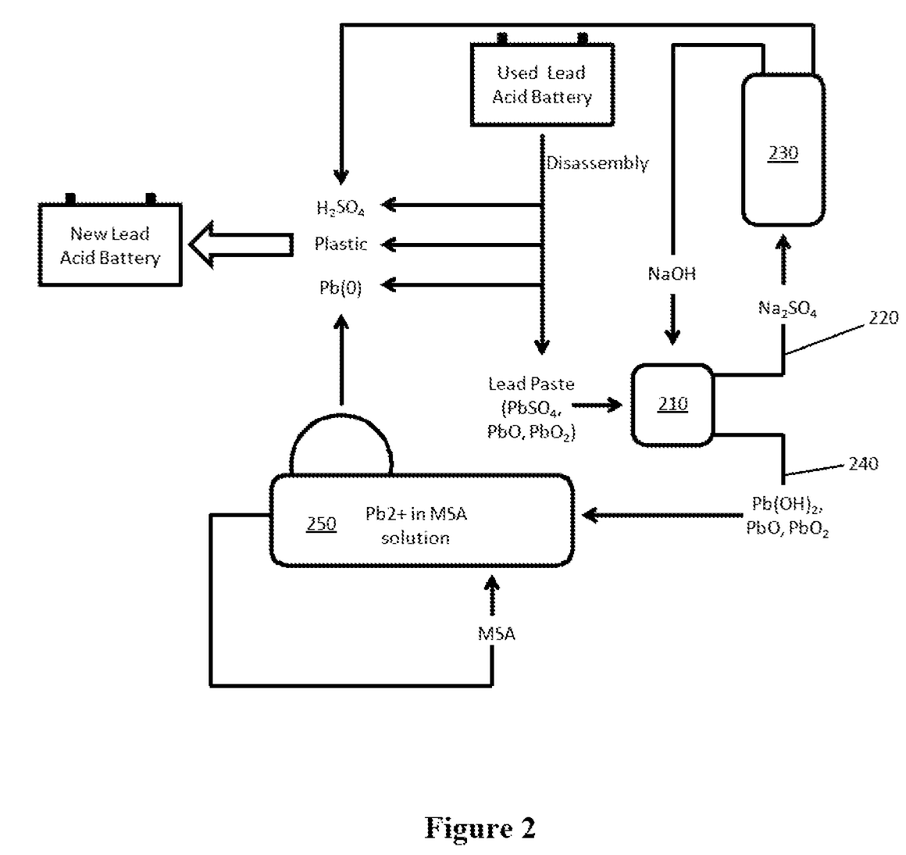
FIG. 2 is an exemplary schematic of a closed loop smelter-less process for recovery of materials from lead acid batteries.

An example of another embodiment of a method of the inventive concept that does not utilize a chelator is depicted schematically in FIG. 2. As shown, a used lead acid battery is initially disassembled. Such disassembly can be ordered, for example by splitting or cutting along edges and/or seems of the case and segregation of solid and liquid components). Alternatively, disassembly can be carried out by crushing, grinding, fragmenting, and/or shredding to provide particulates falling within the size ranges described above. Liquid and solid (e.g. plastic, metallic lead, lead paste) components can be separated by decantation and/or density. Certain components, such as sulfuric acid, plastic, and metallic lead can be recovered directly in a form that is substantially ready for re-use. Insoluble lead paste, containing active material lead species (e.g. lead sulfate and lead oxides) is collected for further treatment in a base treatment vessel 210.

Within the base treatment vessel 210 the lead paste is contacted with a base (NaOH in this example) that acts to generated lead hydroxide and a soluble sulfate salt from the lead sulfate component. Suitable bases include metal hydroxides ($M_x(OH)_y$) for which the corresponding metal sulfate ($M_a(SO4)_b$) is soluble. Suitable examples include Group I metal hydroxides (such as LiOH, NaOH, and KOH). Other bases that provide soluble sulfate salts (i.e. soluble at greater than or equal to 10, 25, 50, 75, 100, 200, 400, 600, or 800 or more g/L) and insoluble (i.e. insoluble at 10, 3, 1, 0.3, 0.1, 0.03, 0.01 or less g/L) lead salts on reaction with $Pb(SO_4)$, for example carbonates (such as $Na_2(CO_3)$ and $K_2(CO_3)$), are also suitable. It should also be appreciated that such bases can be used to rinse or otherwise clean plastic and metallic lead components recovered from a lead acid battery in order to dislodge and recover adhering lead sulfate containing paste, as part of the disassembly process.

From the base treatment vessel 210 a supernatant 220 containing a soluble sulfate salt (depicted as sodium sulfate in this example) and a precipitate 240 containing lead hydroxide and lead oxides are separated and individually recovered. Separation of the sulfate-containing supernatant 220 from the lead-containing precipitate 240 can be performed by any suitable method. For example, the supernatant 220 can be separated from the precipitate 240 by settling, centrifugal separation (for example in a hydrocyclone), and/or filtration. Suitable filters include filtration membranes and meshes, bed filters, press filters, and belt filters. Preferred separation methods are selected to efficiently separate the solid precipitate 240 from the supernatant 220 while facilitating recovery of the precipitate for subsequent processing.

The supernatant 220 can be processed to generate sulfuric acid and regenerate the base used in the treatment of the lead paste recovered from the recycled battery. This can be accomplished through the use of an electrochemical cell 230. For example, when NaOH is used as the base, plating of sodium metal onto the cathode results in the formation of NaOH on reaction with water. This regenerated NaOH can be recovered and returned to the base treatment vessel 210 for extraction of lead paste as part of a closed loop system. Similarly $H_2SO_4$ can be recovered from the anode, and subsequently used in any number of industrial processes. In a preferred embodiment, the recovered sulfuric acid is utilized in the manufacture of lead acid batteries. Any suitable configuration of electrochemical cells can be used. In a preferred embodiment the electrochemical cell is configured as a channel containing a segmented anode and a segmented cathode arranged along its length, where individual electrode segment pairs are individually controllable (as described in U.S. Pat. No. 8,580,414, to Clarke). Such an arrangement advantageously permits single-pass processing at high efficiency.

Precipitate 240 recovered from the base treatment vessel 210 (i.e. base treated active material lead) is dissolved in an alkane sulfonic acid (in this example, MSA). It should be appreciated that, with the removal of sulfate from the active material lead species, a chelator is not required when suitable base treatment of the lead paste is utilized. MSA containing solvated lead ions is treated in an electrodeposition cell 250, as described above. Depletion of lead ions from the alkane sulfonic acid solvent effectively regenerates the solvent, permitting its re-use in solvating the base treated active material lead. Metallic lead (Pb(O) collected by electrodeposition can be collected from a collection cathode of the electrodeposition cell 250 (for example, by scraping) and utilized in any number of industrial processes. As shown in FIG. 2, the materials recovered from an old lead acid battery can be utilized in the construction of a new lead acid battery with no or essentially no net consumption of either base or alkane sulfonic acid solvent, providing a closed loop system for recycling of such batteries that does not utilize a smelting step. Further aspects of contemplated integrated processes and devices are taught in copending US provisional application with the title "Closed Loop Systems And Methods For Recycling Lead Acid Batteries", filed on May 13, 2015.

Surprisingly, the inventors discovered that the metallic lead was recovered from processes of the inventive concept in the form of a micro- or nanoporous mixed matrix in which the lead formed micro- or nanometer sized structures (typically needles/wires) that trapped some of the electroprocessing/electrodeposition solvent and a substantial quantity of molecular hydrogen (i.e., $H_2$). Most notably, such a matrix had a black appearance and a remarkably low bulk density. Indeed, in most of the experimental test runs the matrix was observed to float on the solvent and had a density of less than 1 g/cm3. Upon pressing the matrix or application of other force, the density increased (e.g., 1-3 g/cm3, or 3-5 g/cm3, or higher) and a metallic silvery sheen appeared.

Additionally, it was unexpectedly observed that the reduced lead ions did not form a tightly bonded film on the cathode, but could be readily removed from the cathode by simply wiping the cathode with a material to which the lead could adhere (e.g., plastic, lead-film, etc.). Therefore, lead recovery can be performed in a continuous manner. Particularly where a rotating or reciprocating electrode was employed, lead ions could be reduced one part of an electrode or electrode assembly, while metallic lead can be removed from another part of the electrode or electrode assembly. Especially suitable cathodes and aspects thereof are taught in co-pending US provisional application with the title "Apparatus And Method For Electrodeposition Of Metals On Aluminum Cathodes", filed on May 13, 2015.

As noted above, an electroprocessing solvent can be reused after sufficient quantities of lead had been removed via reduction. It should be recognized that in processes utilizing alkane sulfonic acid+chelator electroprocessing solvents, electrodeposition of metallic lead can results=in the accumulation of sulfate in the solvent. Spent electroprocessing solvent could be processed by mechanical processing (e.g., filter, centrifuge, hydrocyclone, etc.) to remove any solids, and/or chemical processing (e.g., by precipitation of sulfates, for example, to produce calcium or strontium sulfate), and/or adsorptive processing (e.g., activated charcoal, ion exchange resin, etc.) can be utilized to reduce or eliminate accumulated sulfate. Thus, electroprocessing solvents utilized in electrodeposition processes can be reused in the next cycle of processing lead materials for both alkane sulfonic acid and alkane sulfonic acid+chelator solvent systems.

With respect to the alkane sulfonic acid it should be appreciated that numerous alkane sulfonic acids are deemed suitable for use herein. However, MSA is especially preferred as this compound is environmentally friendly and stable under electrolytic conditions used. However, other suitable alkane sulfonic acids include ethyl sulfonate, propylene sulfonate, trifluro methyl sulfonate (triflic acid), sulfamic acid, etc. In most circumstances, the MSA or other alkane sulfonic acid will be present in a significant concentration, typically at least 1-5 wt %, more typically 5-15 wt %, even more typically 25-50 wt %, and most typically between 15 and 35 wt % of the electroprocessing solvent. Thus, suitable concentrations will typically be between 5 and 50 wt %, or between 20 and 30 wt % of the electroprocessing solvent. The pH of the electroprocessing solvent is most preferably acidic as noted above, and most typically between pH 5-7, or between pH 1-3, or between pH 3-5. Viewed form a different perspective, the pH of the electroprocessing solvent will be less than 7, or equal or less than 5, or equal or less than 3.

Similarly, the nature of the chelator may vary considerably. However, it is generally preferred that the chelator is a chelator that is selective or preferential for divalent cations. Therefore, EDTA may be partially or completely replaced by other chelating agents such as NTA (nitrilotriacetic acid), IDA (iminodiacetic acid), DTPA (diethylenetriaminepentaacetic acid), etc. Regardless of the particular type of chelator, it is preferred that the chelator is typically present in an amount of at least 0.1-1 wt %, more typically 1-3 wt %, even more typically 3-10 wt %, and most typically between 2 and 8 wt/o of the electroprocessing solvent. Furthermore, it is noted that the chelator may be provided in form of a salt where the chelator has otherwise reduced solubility in acidic solution (e.g., $Na_2$-EDTA). It should be noted that such concentrations may even exceed the solubility limit of the chelator. Suitable solvent are preferably aqueous and will most preferably be prepared from deionized water. However, additional co-solvents are also deemed suitable and include alcohols, various polyols (propylene glycol, polyethylene glycol, etc.), etc.

Of course, it should be noted that the particular size/dimensions of the electrolytic cell may vary considerably and that the specific process conditions and operating parameters will at least in part determine the size and volume of the electrolytic cell. In especially preferred aspects, however, the electrolytic cell is operable without the need for a membrane separator. Viewed from another perspective, the cell need not be separated in fluidly distinct catholyte and anolyte compartments. Moreover, it should be appreciated that the electrolytic cell need only be fluidly coupled to the container in which the lead materials or base-treated active lead materials are being dissolved. Where treatment of the electroprocessing solvent is considered, it should be noted that the type of treatment will determine the location of such treatment unit, and that the skilled artisan will be readily appraised of the suitable location. However, preferred locations are those where treatment is performed on the lead ion-enriched solvent or the at least partially depleted solvent. As used herein, and unless the context dictates otherwise, the term "coupled to" is intended to include both direct coupling (in which two elements that are coupled to each other contact each other)

and indirect coupling (in which at least one additional element is located between the two elements). Therefore, the terms "coupled to" and "coupled with" are used synonymously.

In other contemplated aspects of the inventive subject matter, and with further respect to the electrodes in the electrolyzer/electrodeposition unit it should be appreciated that numerous electrodes are deemed suitable for use herein. Indeed, it should be noted that all conductive materials are considered suitable for use in conjunction with the teachings herein so long as such materials are compatible with the electrochemical conditions use in the process. Therefore, and among other contemplated materials, suitable anodes include various metals, carbon (typically graphite, glassy carbon, or graphene) anodes, matrices comprising at least one polymer and one form of carbon and especially preferred anodes will be titanium anodes, which may be coated with nuthenium oxide (or other metal oxide). Notably, aluminum has been found not to dissolve in the lead-ion enriched electroprocessing solvent and as such aluminum coated with a conducting and non-passivating material such as ruthenium oxide is contemplated as an anode material. Alternatively Magneli Phase sub-oxides of titanium (of the formula $TixO(2x-1)$ where x is an integer between 4 and 11) have been discovered to be stable anode materials in electrolytes of similar composition to the electroprocessing solvent and are contemplated for use as anode materials and passivation resistant coatings on anodes.

More notably, however, the inventors discovered that the lead recovery process, when using the lead ion-enriched electroprocessing solvents disclosed herein, lead to the formation of a low density lead composition that included lead at a very high purity and that included some of the solvent and hydrogen produced at the cathode. Most remarkably, most if not all of the so formed lead composition was black in color, did not plate and bond as an electrochemically bound film to the cathode, but rather floated onto the surface upon moderate to strong agitation of the solvent. When pressed into a smaller volume, hydrogen and electroprocessing solvent were expelled and the remaining lead returned to a metallic appearance. Unexpectedly, less than 10% (e.g., between 5-9%), more typically less than 7% (e.g., between 2-6%), even more typically less than 5% (e.g., between 1-4%), and most typically less than 3% (e.g., between 0.01-2%) of the total lead formed at the cathode was found as plated and strongly adherent lead on the cathode, while the remainder of the lead remained in the low density form. While not wishing to be bound by any theory or hypothesis, the inventors contemplate that the lead in the low density lead materials formed a micro- or nanoporous mixed matrix comprising micrometer or even nanometer-sized lead filaments to form a porous material in which hydrogen and the solvent were trapped.

Upon further study, the inventors noted that low density and high-purity lead could be obtained from multiple cathode materials, regardless of cathode shape or relative movement of the solvent against the cathode. However, vigorous agitation or movement of the cathode relative to the electroprocessing solvent did simplify 'harvest' of the floating low density lead composition. Therefore, and among other suitable choices, preferred cathode materials include various metals, and especially aluminum. Alternatively, carbon (e.g. graphite, diamond like carbon, graphene, etc.) matrices comprising at least one polymer and one form of carbon, Magneli Phase sub-oxides of titanium (of the formula $TixO(2x-1)$ where x is an integer between 4 and 11) have been discovered to be stable cathodes materials in the electroprocessing solvent and are contemplated for use as cathode surfaces.

While a lack of plating is typically undesirable in all or most electrowinning methods, the inventors now discovered that such lack of plating will enable a continuous lead recycling process in which lead can be continuously removed from the cathode on one segment while additional lead is formed on another segment of the cathode. Removal of the adherent/weakly associated lead is typically done using a mechanical implement (e.g., a wiping surface, blade, or other tool in close proximity to the cathode, etc.), however, removal can also be performed via non-mechanical tools (e.g., via jetting electroprocessing solvent against the cathode, or sparging gas against the cathode, etc.). Moreover, it should be noted that the removal may not use an implement at all, but merely by done by passive release of the low density lead material from the cathode and flotation to the surface of the electrochemical cell (where an overflow weir or harvesting will receive the lead materials).

Figure 3A:
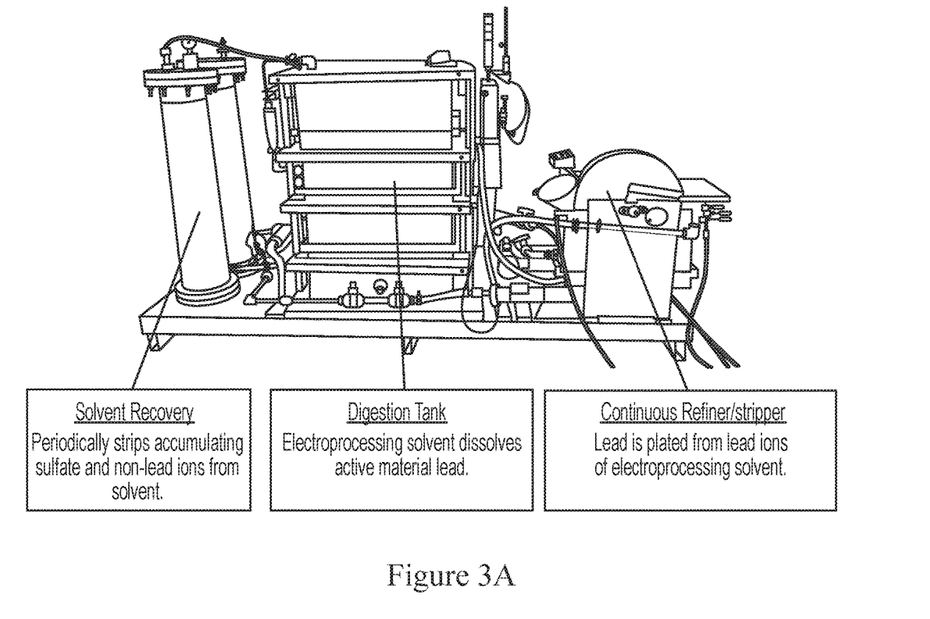
FIG. 3A is an exemplary experimental set up for a process according to FIG. 1B.

Therefore, in at least some preferred aspects, the cathode comprises one or more disk-shaped aluminum cathodes that are rotatably coupled to the electrolytic cell and that are in close proximity to the cathode(s). FIG. 3A is a photograph of a small-scale experimental electrochemical device in which lead acid battery scrap materials (predominantly grid lead and active materials lead) are contacted in a digestion tank. Solid materials are then removed as needed and the lead ion enriched electroprocessing solvent is then fed into the electrolytic cell where low density lead materials are plated on the disk shaped electrode.

In processes that utilize an alkane sulfonic acid+chelator electroprocessing solvent and that do not utilize a base treatment step for removal of sulfate from the active lead species, at least a portion of the electroprocessing solvent is fed to the recovery unit in which an ion exchange resin and a precipitation stage periodically remove sulfate ions and other non-metal ions.

Figure 1C:
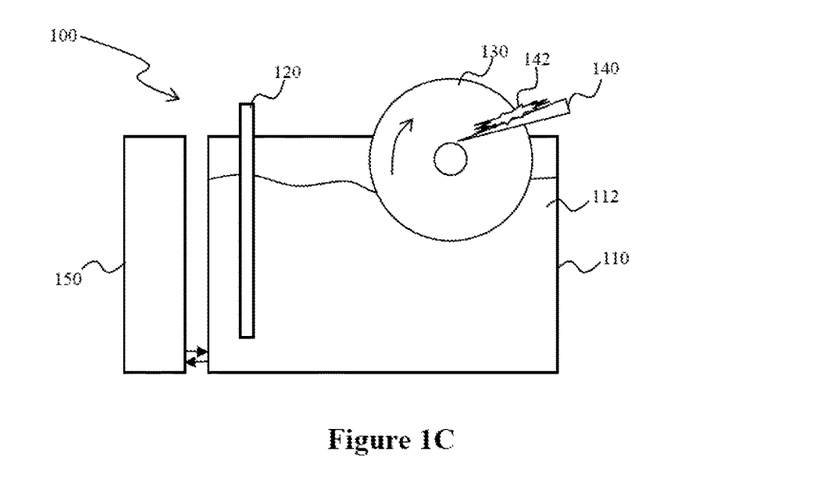
FIG. 1C is an exemplary schematic of an electrolyzer according to the inventive subject matter.
Figure 3B:
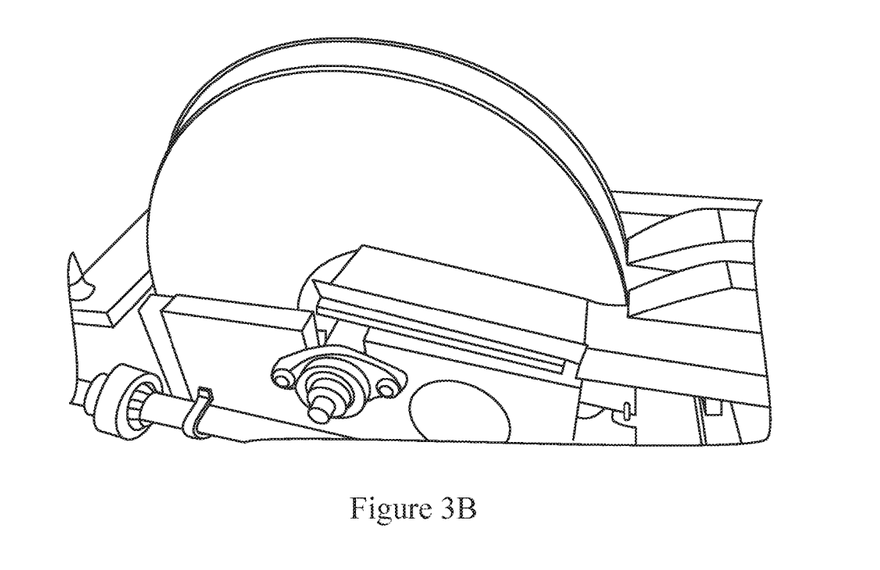
FIG. 3B is a detail view for an electrolyzer with a disc-shaped cathode and a lead product in a micro- or nanoporous mixed matrix.

FIG. 3B is a photograph showing a more detailed view of a pair of disk-shaped cathodes and wiper surface that is proximally positioned to the cathodes to so wipe the low-density lead material from the cathode surface in a non-peeling manner (i.e., without lifting a coherent lead sheet or coherent lead film from the cathode in a pulling motion). FIG. 1C is more schematic exemplary depiction of an electrolyzer/electrodeposition unit according to the inventive subject matter where electrolyzer 100 has a cell 110 that contains a lead ion-enriched electroprocessing solvent 112. Anode 120 and rotating disk-shaped cathode 130 are at least partially disposed in the cell to contact the lead ion-enriched electroprocessing solvent 112 and to promote formation of low density lead product 142 that is taken up by lead harvester 140 (typically a plastic wiper or otherwise proximally positioned surface).

Of course, it should be appreciated that the inventive subject matter is not limited to use of a disk-shaped electrode, but that in fact all electrodes are deemed suitable that allow active (e.g., using a wiping blade or surface) or passive removal (e.g., via bubbles, solvent jetting, or flotation) of high-purity lead from the cathode. Thus, suitable electrodes may be configured as simple plates that may be static relative to the solvent or moved in a reciprocal manner, or electrodes that can be continuously moved and that are configured to allow reduction of lead ions on one portion and lead removal on another portion. For example, suitable electrode configurations include conductive disks, cylinders, spheres, belts, etc. Likewise, it should be recognized that the number of cathodes may vary considerably, and that most typically multiple cathodes are operated in parallel (or serially, especially where the cathodes are static relative to the solvent.

Notably, the inventors realized that cell 110 can be operated without significant anodic destruction (e.g., less than 10% chelator loss per 12 hours of continuous operation) of a chelator of an alkane sulfonic acid+chelator electroprocessing solvent, even in the absence a membrane or other separator. Solvent conditioning unit 150 for removal of sulfate is fluidly coupled to the cell to receive solvent and provide back conditioned solvent in embodiments where removal of accumulated sulfate from the electroprocessing solvent is needed. Solvent processing can be performed in numerous manners and may be continuous or batch-wise. Most typically, processing the solvent includes a step of filtering to remove at least some of the particulates, a step of sulfate removal (e.g., via lime precipitation, reverse osmosis, ion exchange, electro-osmosis, salt splitting, liquid chromatography, liquid/liquid extraction etc.), and/or a step of non-lead metal ion removal (e.g., ion exchange). Where the process is operated in a batch mode, collection of multiple streams of solvent is especially preferred, and a surge or holding tank may therefore be added to the system. On the other hand, where the system is continuously operated, multiple streams may be combined and then processed to reduce redundancy and plot space.

Lastly, with respect to the grid lead recovered from the lead ion-enriched solvent, it should be noted that the grid lead may be washed (for example with base or with an alkane sulfonic acid+chelator solvent), compacted, and ingoted or be further refined to increase purity where desired. Residual plastic materials are preferably collected from the scrapping operation and recycled in a separate process stream using conventional plastic recycling methods.

It should be appreciated that the described processes can be performed in a batch manner, in which a single bolus of lead paste is processed to produce a discrete batch of soluble sulfate salt and a discrete batch of lead-containing precipitate. Using suitable separation methods, however, processes of the inventive concept can be performed in a continuous fashion, with a stream of lead paste being processed to produce streams of sulfuric acid and precipitate. In some embodiments processes of the inventive concept can be performed in a semi-continuous manner, for example by providing discrete boluses of lead paste in succession.

Experimental Data and Considerations

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In a first set of experiments, the inventors investigated the ability of a solvent to digest various components of a lead acid battery and in a second set of experiments to investigate the ability to electroplate or reduce the dissolved lead (optionally after filtration). Digestion of the various components was initially carried out using only MSA in concentrations ranging from 1-50 wt %. At all concentrations the majority of the lead oxides were extremely soluble. However, the inventors did not attempt to isolate and test insoluble forms of $PbO_2$ in the initial work because it was quickly apparent that lead sulfate ($PbSO_4$) did not digest very well. Although soluble, the overall concentration of lead sulfate was low (as measured by solution density), the rate of digestion was also slow (upwards of 24 hours), and digestion required agitation and heat. With the addition of disodium ethylenediamine tetraacetic acid (EDTA), both the concentration and digestion rate were vastly improved. The density increased from 1.2 $g/cm^3$ to greater than 2.1 gi $cm^3$. More importantly and unexpectedly, lead was easily electroplated/reduced from this solution, in acid conditions and without the need for a membrane.

In a preferred set of experiments, the MSA concentration was approximately 25 wt % (+/−5) MSA in combination with approximately 5 wt % disodium EDTA. For example, a typical solution was made up as follows: 100 L of 98% MSA, 20 kg of disodium EDTA, the remainder of water filled to 450 L total volume. However, the actual amounts used may vary by as much as 10%. Notably, this solution was able to digest approximately 33 kg of mixed battery materials in a 12 hour period without heating or significant agitation. The starting density was 1.1 g $cm^3$ and the maximum density achieved was 1.6 $g/cm^3$. It should be appreciated that some of the EDTA did not dissolve (possibly due to reaching saturation concentration in the acidic solution), and it is estimated that about 2 to 5 kg of the disodium EDTA did not fully dissolve and was captured as tank scaling or on the filters during recirculation. Therefore, in most practical examples, preferred electroprocessing solvents will include 20-30% MSA, 2-8% EDTA, with the remainder deionized water.

Remarkably, the bulk of lead oxide and sulfate are highly soluble in contemplated electroprocessing solvents while metallic lead (and solid lead alloys from lead grids) did not dissolve and was stripped clean of contamination; under most experimental conditions, 60-90% current efficiency was observed with a low voltage needed. Due to selective dissolving of the positive and negative active materials (PAM and NAM), substantially less energy for overall lead recycling is required.

Using a reclamation set up as shown in FIG. 3A, and a total swept cathode area of 0.252 $m^2$ and a tank size 10 US gallon, the following data in Table 1 and 2 were obtained:

TABLE 1

| Batch | Run | RPM | Scraper | A | A/m2 Cathode | Vi | Vf | T |
|---|---|---|---|---|---|---|---|---|
| 1 | 1 | 5.00 | on | 50.00 | 197.72 | 3.00 | 3.50 | 10.00 |
| 1 | 2 | 5.00 | on | 100.00 | 395.44 | 3.90 | 4.10 | 10.00 |
| 1 | 3 | 5.00 | on | 150.00 | 593.16 | 4.40 | 4.60 | 10.00 |
| 1 | 4 | 5.00 | on | 50.00 | 197.72 | 3.10 | 3.40 | 10.00 |
| 2 | 1 | 5.00 | on | 150.00 | 593.16 | 4.40 | 4.50 | 5.00 |
| 2 | 2 | 5.00 | on | 150.00 | 593.16 | 4.50 | 4.50 | 5.00 |
| 2 | 3 | 10.00 | on | 150.00 | 593.16 | 4.50 | 4.60 | 5.00 |
| 3 | 1 | 10.00 | on | 100.00 | 395.44 | 3.70 | 3.80 | 5.00 |

TABLE 1-continued

| Batch | Run | RPM | Scraper | A | A/m2 Cathode | Vi | Vf | T |
|---|---|---|---|---|---|---|---|---|
| 3 | 2 | 10.00 | on | 100.00 | 395.44 | 3.80 | 4.10 | 5.00 |
| 3 | 3 | 10.00 | on | 100.00 | 395.44 | 3.90 | 4.10 | 5.00 |
| 3 | 4 | 10.00 | on | 215.00 | 850.20 | 5.00 | 5.00 | 5.00 |
| 3 | 5 | 2.00 | on | 100.00 | 395.44 | 3.80 | 3.80 | 5.00 |
| 3 | 6 | 1.00 | at end | 93.00 | 367.76 | 3.80 | 3.80 | 5.00 |
| 3 | 7 | 1.00 | at end | 90.00 | 355.90 | 3.80 | 3.80 | 5.00 |
| 4 | 1 | 1.00 | at end | 400.00 | 1581.76 | 6.40 | 6.60 | 5.00 |
| 5 | 1 | 1.00 | at end | 200.00 | 790.88 | 4.60 | 4.60 | 5.00 |
| 5 | 2 |  | on | 200.00 | 790.88 | 4.80 | 4.80 | 5.00 |
| 5 | 3 |  | on | 200.00 | 790.88 | 4.70 | 4.70 | 5.00 |
| 5 | 4 |  | on | 200.00 | 790.88 | 4.80 | 4.80 | 5.00 |
| 5 | 5 |  | on | 200.00 | 790.88 | 4.60 | 4.60 | 6.20 |
| 5 | 6 |  | on | 200.00 | 790.88 | 4.70 | 4.70 | 5.00 |
| 5 | 7 |  | on | 200.00 | 790.88 | 4.70 | 4.70 | 5.00 |

TABLE 2

| Batch | Run | wet g | dry g | g/hr | g/Ah | kg/h/m2 | Pb (g/l) at start | CE % Theory |
|---|---|---|---|---|---|---|---|---|
| 1 | 1 |  | 30.41 | 182.43 | 3.65 | 0.72 | 10.03 | 0.96 |
| 1 | 2 |  | 50.39 | 302.32 | 3.02 | 1.20 | 9.22 | 0.80 |
| 1 | 3 |  | 49.69 | 298.14 | 1.99 | 1.18 | 7.89 | 0.52 |
| 1 | 4 | 32.89 | 22.37 | 134.24 | 2.68 | 0.53 | 6.58 | 0.71 |
| 2 | 1 | 48.77 | 31.17 | 374.04 | 2.49 | 1.48 | 10.03 | 0.66 |
| 2 | 2 | 40.77 | 28.74 | 344.88 | 2.30 | 1.36 | 9.27 | 0.61 |
| 2 | 3 | 40.26 | 29.47 | 353.64 | 2.36 | 1.40 | 8.49 | 0.62 |
| 3 | 1 |  | 22.18 | 266.16 | 2.66 | 1.05 | 10.03 | 0.70 |
| 3 | 2 |  | 26.64 | 319.68 | 3.20 | 1.26 | 9.44 | 0.84 |
| 3 | 3 |  | 20.82 | 249.84 | 2.50 | 0.99 | 8.74 | 0.66 |
| 3 | 4 |  | 37.78 | 453.36 | 2.11 | 1.79 | 8.19 | 0.57 |
| 3 | 5 |  | 20.30 | 243.60 | 2.44 | 0.96 | 7.19 | 0.66 |
| 3 | 6 |  | 12.70 | 152.40 | 1.64 | 0.60 | 6.66 | 0.43 |
| 3 | 7 |  | 10.38 | 124.56 | 1.38 | 0.49 | 6.32 | 0.36 |
| 4 | 1 |  | 56.79 | 681.48 | 1.70 | 2.69 | 10.03 | 0.45 |
| 5 | 1 |  | 33.80 | 405.60 | 2.03 | 1.60 | 10.03 | 0.53 |
| 5 | 2 |  | 34.50 | 414.00 | 2.07 | 1.64 | 9.12 | 0.55 |
| 5 | 3 |  | 30.48 | 365.76 | 1.83 | 1.45 | 8.31 | 0.48 |
| 5 | 4 |  | 28.40 | 340.80 | 1.70 | 1.35 | 7.56 | 0.45 |
| 5 | 5 |  | 31.70 | 306.77 | 1.53 | 1.21 | 6.73 | 0.40 |
| 5 | 6 |  | 22.90 | 274.80 | 1.37 | 1.09 | 6.12 | 0.36 |
| 5 | 7 |  | 20.50 | 246.00 | 1.23 | 0.97 | 5.58 | 0.32 |

Figure 4A:
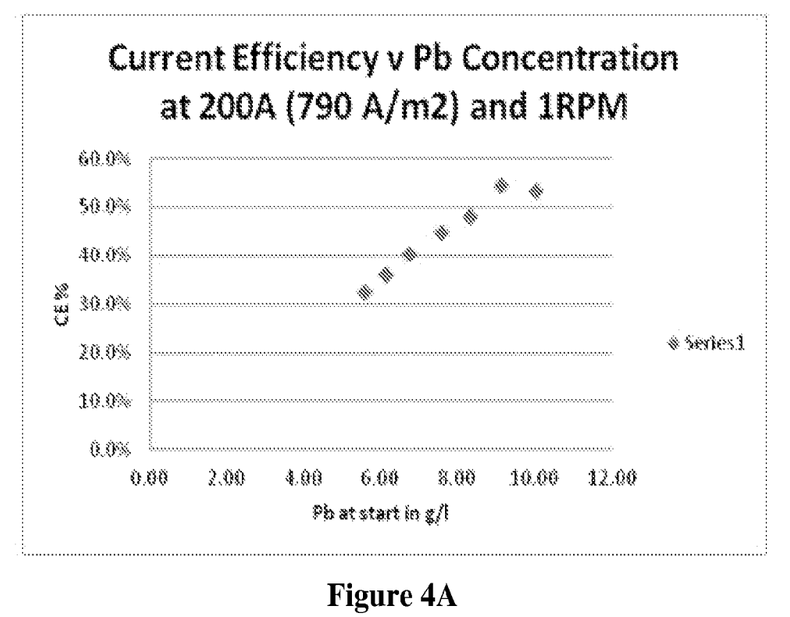
FIGS. 4A-4C are graphs illustrating current efficiencies (CE) as a function of lead concentration (4A, 4C) and current density (4B) using an electrolyzer according to the inventive subject matter.
Figure 4B:
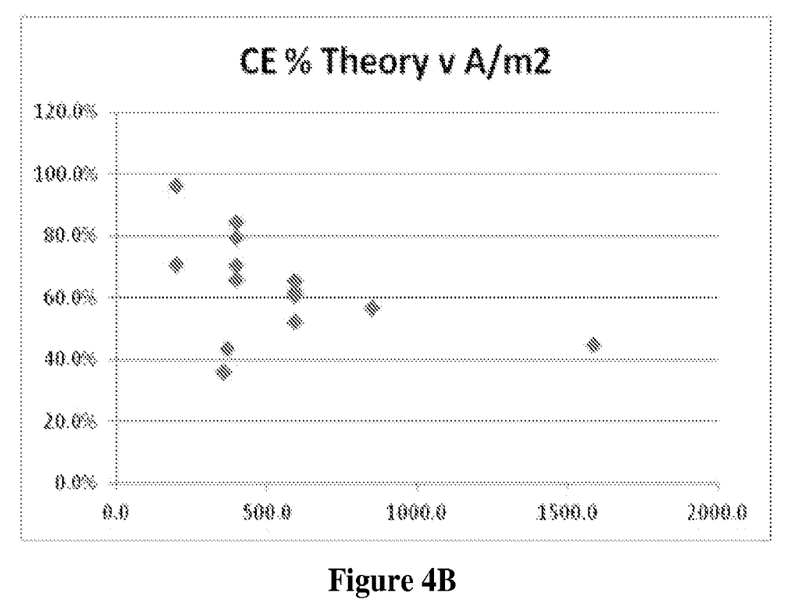
Figure 4C:
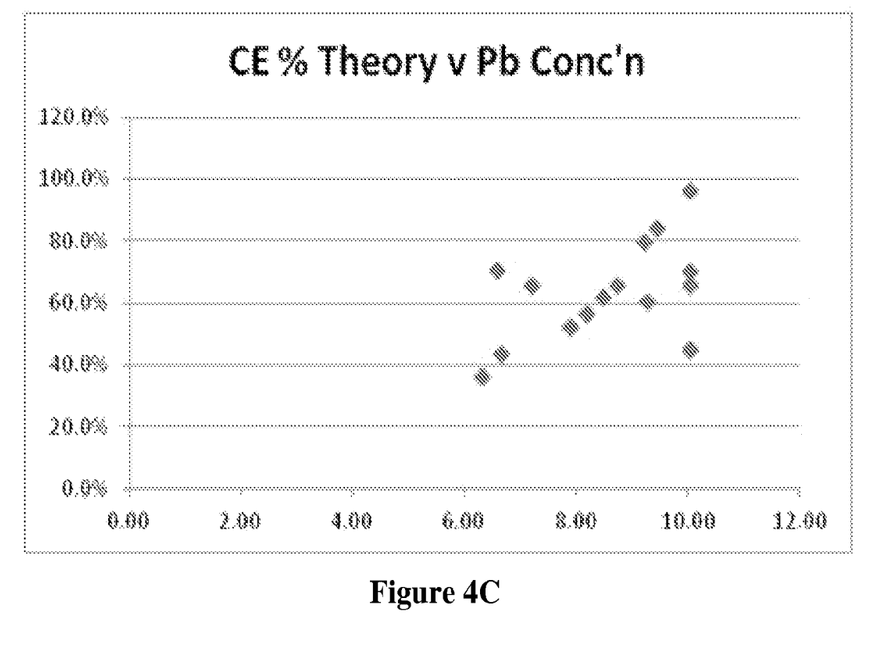

Efficiencies for plating are depicted in FIGS. 4A-4C, wherein FIG. 4A shows the current efficiency of lead production as a function of the initial lead concentration at 200A at a current density of 790 A/m² and 1 rpm of the disk cathode. FIG. 4B shows the current efficiency as a function of electrode current density, and FIG. 4C plotted current efficiency against lead concentration.

As is shown in Table 3 below, high purity lead was obtained at the cathode as a micro- or nanoporous mixed matrix having a density of less than 1 g/cm³ (floating on the surface of the solvent). Moreover, the lead composition did not plate on the cathode as a solid and coherent film but was recovered as amorphous soft and compressible mixed material that contained the methane sulfonic acid and hydrogen.

TABLE 3

| Element | Quant. | Det. Limit | Actual |
|---|---|---|---|
| Bismuth | ppm, (µg/g) | 0.1 | 1.3 |
| Copper | ppm, (µg/g) | 0.1 | 1.1 |
| Lead | ppm, (µg/g) | 0.1 | Major (99.5%+) |
| Potassium | ppm, (µg/g) | 0.5 | 18 |
| Sodium | ppm, (µg/g) | 0.1 | 0.20 |
| Tin | ppm, (µg/g) | 0.2 | 30 |

Notably, the so obtained mixed material was different from conventional sponge lead that is normally produced using foaming agents or gas injection during cooling of liquid lead that was previously purified.

It should be appreciated that methods and reagents of the inventive concept, while described above in terms of recycling of lead acid batteries, can also be applied to the recovery of sulfate from other sources. Suitable alternative sources include sulfate-containing salts with corresponding insoluble hydroxides or, alternatively, unstable hydroxides that form insoluble oxides. Examples of sulfate-containing materials from which sulfate can be extracted include materials that include sulfate salts of Group II elements, transition metals, and aluminum.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of processing lead materials from lead acid batteries, comprising:
   providing lead materials comprising grid lead and active material lead, wherein the active material lead comprises lead sulfate;
   treating the lead materials to allow an electroprocessing solvent to selectively dissolve the active material lead to so form a lead ion-enriched electroprocessing solvent and solid grid lead;
   wherein the electroprocessing solvent is an aqueous solution of an alkane sulfonic acid;
   removing at least some of the grid lead from the lead ion-enriched electroprocessing solvent;
   reducing lead ions in the lead ion-enriched electroprocessing solvent on a cathode to form high-purity lead and regenerated electroprocessing solvent; and
   wherein the steps of providing lead materials, treating the lead materials, removing at least some of the grid lead, and reducing lead ions are performed to allow processing in a continuous fashion.

2. The method of claim 1 further comprising a step of extracting at least some sulfate from the active material lead by contacting the active material lead with a base, thereby generating a soluble sulfate.

3. The method of claim 2, further comprising the steps of recovering the base from the soluble sulfate as a recycled base, and utilizing at least a portion of the recycled base in the extraction of sulfate from the active material.

4. The method of claim 1 wherein the electroprocessing solvent comprises the alkane sulfonic acid in an amount of between 5 and 50 wt % and a chelator in an amount of between 0.5 and 20 wt %.

5. The method of claim 1 wherein reducing the lead ions is performed concurrently with a further step of removing at least some of the high-purity lead from the cathode.

6. The method of claim 1 wherein reducing the lead ions is performed under conditions that form a micro- or nano-porous mixed matrix having a density of less than 5 g/cm$^3$.

7. The method of claim 1 wherein the cathode is moved relative to the lead ion-enriched electroprocessing solvent during the step of reducing the lead ions.

8. The method of claim 1 further comprising a step of removing sulfate and/or a metal ion other than lead from the regenerated electroprocessing solvent.

9. The method of claim 1 further comprising a step of using at least some of the regenerated electroprocessing solvent in the step of contacting the lead materials with the electroprocessing solvent.

10. The method of claim 1 wherein the electroprocessing solvent comprises an alkane sulfonic acid and does not include a chelator.

11. The method of claim 1 further comprising a step of disassembling the lead acid batteries to so recover sulfuric acid, plastic parts, metallic lead, and/or the lead materials comprising grid lead and active material lead.

12. The method of claim 11 further comprising a step utilizing at least some of the sulfuric acid in a step of producing a new lead acid battery.

13. The method of claim 11 further comprising a step utilizing at least some of the plastic parts in a step of producing a new lead acid battery.

14. The method of claim 11 further comprising a step utilizing at least some of the metallic lead in a step of producing a new lead acid battery.

15. The method of claim 2 further comprising the steps of recovering sulfuric acid from the soluble sulfate, and optionally utilizing at least a portion of the recovered sulfuric acid in a step of producing a new lead acid battery.

16. The method of claim 1 wherein the high-purity lead has a purity of at least 98%.

* * * * *